United States Patent [19]

Packard et al.

[11] Patent Number: 4,680,790
[45] Date of Patent: Jul. 14, 1987

[54] BEDSIDE CONTROL MODULE FOR HEALTHCARE STATIONS AND THE LIKE

[75] Inventors: Richard F. Packard, Stevens Point; Kenneth R. Cover, Plover, both of Wis.

[73] Assignee: Joerns Healthcare, Inc., Stevens Point, Wis.

[21] Appl. No.: 768,206

[22] Filed: Aug. 22, 1985

[51] Int. Cl.⁴ .................. H04Q 1/00; H04M 1/00
[52] U.S. Cl. .................. 379/432; 340/286 R; 5/60; 379/454
[58] Field of Search ........ 5/60, 61, 62, 63, 66, 5/64, 65, 67, 68, 99; 340/365 R, 368, 311.1, 700, 310 R, 332, 573, 286 R, 825.19, 862; 128/DIG. 12, DIG. 13; 179/81 B, 100 L, 2 TV, 146 R, 179, 178, 90 K; 379/454, 455, 432, 433, 420, 426

[56] References Cited

U.S. PATENT DOCUMENTS

| | | | |
|---|---|---|---|
| 2,607,881 | 8/1952 | Anderson | 5/508 X |
| 2,910,680 | 10/1959 | McLain | 340/311.1 |
| 2,924,671 | 2/1960 | Barry | 179/146 R |
| 3,137,773 | 6/1964 | Black | 200/5 E |
| 3,599,199 | 8/1971 | Bunting | 340/286 R |
| 3,659,050 | 4/1972 | Carlsson et al. | 179/81 B |
| 3,660,591 | 5/1972 | Schultz et al. | 174/70 R |
| 3,757,363 | 9/1973 | Langlais | 5/503 |
| 3,802,657 | 4/1974 | Jackson | 248/214 |
| 3,835,486 | 9/1974 | Benoit et al. | 5/503 |
| 3,971,028 | 7/1976 | Funk | 307/157 |
| 4,101,735 | 7/1978 | Bridenbaugh | 179/81 B |
| 4,162,486 | 7/1979 | Wyler | 340/310 A |
| 4,174,517 | 11/1979 | Mandel | 340/310 A |
| 4,183,015 | 1/1980 | Drew et al. | 340/286 R |
| 4,200,862 | 4/1980 | Campbell et al. | 340/310 A |
| 4,298,863 | 11/1981 | Natitus et al. | 340/573 |
| 4,330,776 | 5/1982 | Dennison, Jr. et al. | 340/365 R |
| 4,386,436 | 5/1983 | Kocher et al. | 455/151 |
| 4,392,022 | 7/1983 | Carlson | 179/2 TV |
| 4,415,781 | 11/1983 | Frame et al. | 200/5 A |
| 4,418,334 | 11/1983 | Burnett | 340/332 |
| 4,427,847 | 1/1984 | Hofmann et al. | 179/2 TV |
| 4,431,154 | 2/1984 | Hamm | 248/215 |
| 4,432,522 | 2/1984 | Pruente et al. | 248/215 |
| 4,436,965 | 3/1984 | Morse | 179/184 |
| 4,438,300 | 3/1984 | Morse | 179/184 |
| 4,484,367 | 11/1984 | Jenkins | 5/425 |
| 4,489,454 | 12/1984 | Thompson | 5/503 |
| 4,496,351 | 1/1985 | Hillel et al. | 604/250 |

Primary Examiner—Gene Z. Rubinson
Assistant Examiner—R. Vaas
Attorney, Agent, or Firm—Price, Heneveld, Cooper, DeWitt & Litton

[57] ABSTRACT

A bedside control module is provided for healthcare stations and the like, of the type generally having a bed, and at least two control functions, such as bed adjustments, nurse call, telephone, television, radio, lights, and other such accessories. The control module includes a dual-sided control panel that is supported by an arm at a position adjacent to the bed for access by the user. Both sides of the control panel include manually-operable controllers for operating the various control functions. The control panel is rotatably mounted on the support arm for manual rotation about a normally, generally vertical axis that is oriented to selectively and sequentially present the opposite sides of the control panel to the user to regulate the various control functions.

38 Claims, 3 Drawing Figures

BEDSIDE CONTROL MODULE FOR HEALTHCARE STATIONS AND THE LIKE

BACKGROUND OF THE INVENTION

The present invention relates to controllers and communicators for healthcare stations and the like.

Controllers are well known in the healthcare industry to regulate the various control functions associated with modern healthcare stations, such as those found in hospitals, and other similar institutions. Typical control functions include position adjustments for an adjustable bed, nurse call, television, radio, telephone, room lights, reading lights, and other such accessories.

At least some of these control functions are usually regulated by a controller device located near the bed. Examples of such controllers are pillow speakers, pendants, and side rail control modules.

Pillow speakers and pendants, such as the unit disclosed in U.S. Pat. No. 4,418,334 to Burnett, tend to become tangled in the bed or fall onto the floor during use, and thus do not consistently remain at a convenient location to the patient or attendant. As a result, the efficiency of the controller, either as a communicator or as an accessory control device, is greatly diminished. Further, due to size constraints associated with pillow speakers and pendants, such units usually have limited control capacity. Pillow speakers and pendants also are subject to physical abuse and damage as the patient moves in the bed.

Side rail control modules, such as the units disclosed in U.S. Pat. Nos. 4,183,015 to Drew et al and 3,932,903 to Adams et al experience a drawback insofar as the controllers are not readily accessible or are not fully operative when the side rails or side guards of the bed are lowered. Furthermore, side rail control modules cannot be readily manipulated by the patient when the patient is not positioned in the bed to which the side rails are attached.

SUMMARY OF THE INVENTION

One aspect of the present invention is to provide a bedside control module for healthcare stations and the like of the type generally having a bed, and at least two control functions. The control module includes a dual-sided control panel that is supported adjacent to the bed for access by the user. Both sides of the control panel include manually-operable controllers for operating the various control functions. The control panel is rotatably mounted on the support for manual rotation about an axis that is oriented to selectively and sequentially present the opposite sides of the control panel to the user to regulate the various control functions.

Another aspect of the present invention is a communication control panel that is supported on a flexible arm to position the control panel at a conveniently accessible position near the patient. The control panel includes a speaker telephone having a large-button touch dial, and a line connect/disconnect button on one side of the control panel, such that the patient can either answer incoming calls, or initiate outgoing calls with a single hand from an inclined position in the bed.

The principal objects of the present invention are to provide a bedside control module for healthcare stations that can be easily used by either a patient or an attendant. The control module includes a dual-sided control panel that is supported by an arm at a convenient location near the bed for access by the user. Both sides of the control panel may include manually-operable controllers, such that the user simply rotates the control panel axially to select that particular controller for which adjustment is desired.

Preferably, one of the control panel sides includes a speaker telephone with a large-button touch dial, such that the patient can accept incoming calls, and initiate outgoing calls, with only one hand. The control panel is preferably sealed, with membrane type switches to facilitate cleanliness and sanitation. Furthermore, the individual switches preferably have raised ridges about their periphery, with embossed indicia to enable the patient to discern the particular control switch by touch. The bedside control module is particularly efficient in use, economical to manufacture, capable of a long operating life, and well adapted for the proposed use.

These and other features, advantages, and objects of the present invention will be further understood and appreciated by those skilled in the art by reference to the following written specification, claims and appended drawings.

DETAILED DESCRIPTION OF THE PREFERRED EMBODIMENTS

Figure 1:
FIG. 1 is a perspective view of a bedside control module embodying the present invention, shown attached to an adjustable bed.

For purposes of description herein, the terms "upper," "lower," "right," "left," "rear," "front," "vertical," "horizontal" and derivatives thereof shall relate to the invention as oriented in FIG. 1. However, it is to be understood that the invention may assume various alternative orientations, except where expressly specified to the contrary.

The reference numeral 1 (FIG. 1) generally designates a bedside control module embodying the present invention. Bedside control module 1 is particularly adapted for use in conjunction with healthcare stations, and the like, of the type generally having a bed 2, and at least two control functions, such as bed adjustments, nurse call, telephone, television, radio, lights, and other such accessories. Bedside control module 1 includes a dual-sided control panel 3 that is supported adjacent to bed 2 by an arm 4 for access by the user. Control panel 3 has opposite sides 5 and 6, which both include manually-operable controllers 7 and 8 respectively for operating the various control functions. Control panel 3 is rotatably mounted on support arm 4 for manual rotation about an axis that is oriented to selectively and sequentially present the opposite sides 5 and 6 of control panel 3 to the user to regulate the various control functions.

The illustrated bed 2 is a conventional adjustable bed, having adjustable head and foot sections 12 and 13, and associated pairs of side rails 14 and 15, and a frame 16. Both the head and foot sections 12 and 13 of bed 2 can be independently raised and lowered by controlling associated motors (not shown).

Figures 2, 3:
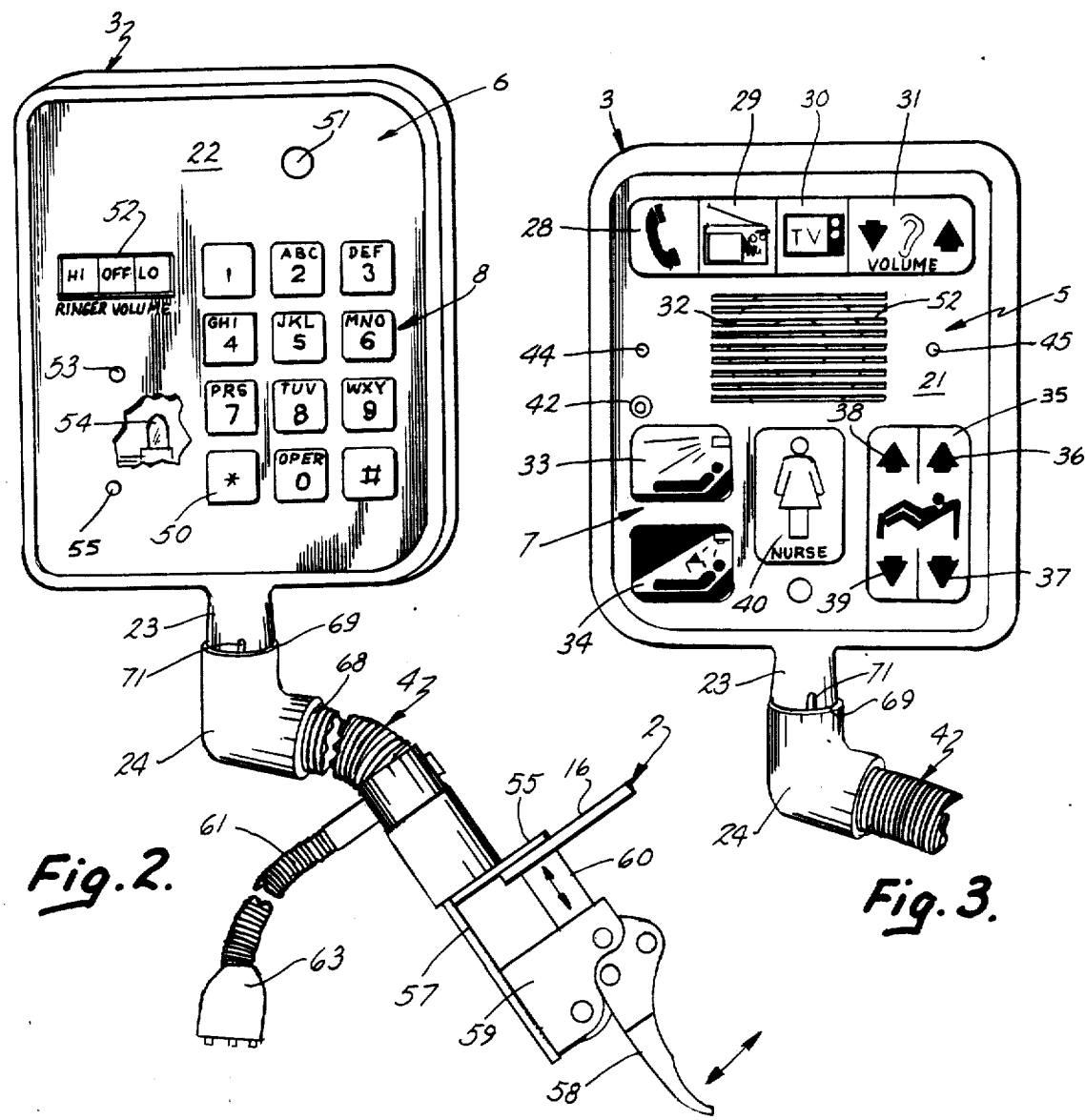
FIG. 2 is a fragmentary, rear elevational view of the bedside control module.
FIG. 3 is a fragmentary, front elevational view of the bedside control module.

In the illustrated embodiment, control panel 3 (FIGS. 2 and 3) has a generally rectangular side elevational shape and includes a marginal frame 20, a front cover 21, and a rear cover 22. Front and rear covers 21 and 22 attach to the opposite sides of marginal frame 20 to form a hollow body in which various switches and other electrical devices are mounted, as discussed in greater detail below. A generally cylindrically-shaped post 23 is connected with and extends vertically downwardly from the lower leg of frame 20, and is rotatably received in a mating elbow 24.

A plurality of membrane type switches are mounted in control panel 3, and are manipulated by an associated push-button located on the front cover 21 of control panel 3. In the illustrated example, such switches and corresponding push-buttons include a telephone connect/disconnect 28, which when pushed answers incoming telephone calls. A radio controller 29 is provided to turn a remotely located radio on and off, and may also control channel selection. A television controller 30 is provided to turn a remotely located television on and off, and may also control channel selection. A volume controller 31 is provided to regulate the loudness of audio signals emitted from control panel 3 through a combination speaker/microphone 32 mounted in the interior of control panel 3. Volume controller 31 is electrically connected with telephone pick-up 28, radio controller 29, and television controller 30, so as to adjust the volume of the audio signals emitted in conjunction with each associated control function.

A room light controller 33 is provided to turn a remotely located overhead light on and off. A reading light controller 34 is provided to turn an overhead reading lamp on and off. An adjustable bed controller 35 is provided to adjust the various movable portions of bed 2, including up and down buttons 36–39 for both the head and foot sections 12 and 13 of bed 2. A nurse call 40 is located centrally in the front cover 21 of control panel 3, and communicates with a remote nursing station to indicate that the patient requires the assistance of an attendant. The nurse call audio alarm volume is set so that it cannot be turned off or set to an improper level. A headset jack 42 is provided on control panel 3, and is adapted to receive therein a mating portion of an audio headset 43, which provides privacy for the patient. When audio headset 43 is connected with headset jack 42, audio signals from the telephone, radio and television are transmitted only through headset 43. Indicator lights 44 and 45 are provided on front cover 21 to visually indicate that the various control functions are in operation.

The front panel controllers 28–31 and 33–40 (FIG. 3) preferably have raised ridges that extend about the perimeter of each manually-operable controller to facilitate locating the same by touch. Furthermore, each such controller 29–31 and 33–40 preferably includes different embossed indicia to identify the same by touch. The illustrated indicia is a graphical representation of the control function to be regulated, so as to also provide visual recognition of the various control buttons. The nurse call button 40 preferably has a bright color in contrast to the remaining controllers, and is textured to facilitate quick location in the case of an emergency. A light 46 is located directly below nurse call button 40, and is energized to visually confirm that a nurse call signal has been sent by the patient, and also when a message is being sent to the patient from the nursing station to provide a visual alert.

Indicator light 44 is energized when an incoming telephone call is received to provide a visual alert to the patient. This visual alert is particularly beneficial in the case of hearing impaired patients and/or when the audio volume controller 31 is set very low. Indicator light 45 can be connected to energize when any of the remaining controllers is on, such as radio 29, television 30, lights 33 and 34 and bed control 30, so as to provide a visual alert to the patient.

The rear cover 22 (FIG. 2) of control panel 3 includes a large-button touch dial 50 for an associated speaker telephone. The buttons on touch dial 50 are generally as large as possible, covering a major portion of rear cover 22. The dial buttons also have raised ridges that extend about the perimeter of the button to facilitate locating the same by touch. The dial buttons also have large, embossed numerals and/or letters to easily identify the same both visually and by touch. A telephone connect/disconnect button 51 is also provided on rear cover 22 to initiate incoming calls, and to terminate the telephone line connection. A three position volume controller 52 is provided on rear cover 22 to adjust the loudness of the telephone ringer. Volume controller 52 may also have raised marginal ridges with embossed letters to facilitate location and manipulation of the associated buttons. An indicator light 53 is also provided on rear cover 22 to visually indicate when the telephone line is open or connected. A power on light 55 may be provided on rear corner 22 to advise attendants that bedside control module 1 is functioning properly.

Front and rear covers 21 and 22 have a generally flat, planar shape, and are mutually parallel. Front cover 21 has a slotted grid 53 located over speaker/microphone 32. Control panel 3 is otherwise sealed to prevent moisture from entering the same, and to facilitate cleaning and sanitation. Front and rear covers 21 and 22 are also preferably translucent. A light 54 (FIG. 2) is located in the hollow interior of control panel 3, so as to backlight control panel 3 for improved visibility, especially during the nighttime.

The illustrated support arm 4 is a generally elongated, cylindrically-shaped, hollow corrugated tube that is selectively deformable or bendable. Support arm 4 is sufficiently stiff that it will not normally flex as a result of manipulation of the various controllers 29–31 and 33–40, yet is sufficiently flexible to permit manual deflection or adjustment of the same by either the patient or an attendant. Support arm 4 encases and protects wires (not shown) which extend from control panel 3 to the frame 16 of bed 2.

The lower end of support arm 4 is attached to a clamp assembly 56, which releasably attaches bedside control module 1 to either side of bed 2. The illustrated clamp assembly 56 comprises a quick disconnect latch 57 having a handle 58 pivotally attached to a mating bracket 59. Rotation of handle 58 outwardly (to the right as viewed in FIG. 2) retracts a reciprocating plunger portion 60 of latch 57 from backing plate 55 to release the same from bed 2. Rotation of handle 58 in the opposite direction extends plunger 60 into a clamped position on bed 2. A flexible conduit 61 houses wires from control panel 3, and extends from a base portion 62 of clamp assembly 57, and includes a jack or socket connector 63 attached to the free end thereof. Preferably, clamp assembly 57 includes a pivot joint 64, which allows support arm 4 and control panel 3 to be swung downwardly into a storage position toward the frame 16 of bed 2.

The upper end of support arm 4 is attached to one end 68 of elbow 24. The opposite end 69 of elbow 24 rotatably receives the post portion 23 of control panel frame 20 therein. Hence, in the illustrated example, control panel 3 rotates about a substantially longitudinal or axial axis which is located centrally between the front and rear covers 21 and 22 and is parallel therewith. The axis of rotation of control panel 3 is normally, generally vertical as shown in FIG. 1, but may also assume various other orientations. The fit between frame post 23 and mating elbow end 69 is sufficiently tight that the frictional forces will normally prevent control panel 3 from rotating as the result of manipulation of the various controllers 28-31 and 33-40, yet is sufficiently loose to permit manual rotation of the same by patients and other users. Furthermore, a stop 71 is provided in the joint between frame post 23 and elbow end 69, so as to prevent control panel 3 from rotating more than 360 degrees in any one direction. In this manner, the electrical wires (not shown) which extend from control panel 3 through elbow 24 and support arm 4 will not become twisted.

In use, bedside control module 1 can be attached to either side of bed 2 by simply latching clamp 57 to the selected side of bed 2. In the illustrated example, clamp 57 is attached to the right-hand side of the head section 12 of bed 2 to position control panel 3 along the right-hand side of bed 2 for a right-handed patient. Support arm 4 extends between the adjacent ends of the right-hand side rails 14 and 15 on the head and foot sections 12 and 13 of bed 2. A patient reclining in bed 2 can readily grasp control panel 3, and move the same to a convenient location to manipulate the various controllers 29-31 and 33-40. To operate the speaker phone, the patient simply pivots control panel 3 axially to present the rear face 22 of the control panel to the patient. Button 51 is pushed to obtain a dial tone, and buttons 50 are sequentially depressed to dial the selected telephone number. After the telephone conversation is over, button 51 is depressed to again hang up or close the telephone line. Hence, a telephone call can thus be initiated and completed by the patient in a reclined position with a single hand. Use of audio headset 43 provides the patient with privacy, and alleviates disruption of other patients in the healthcare station. The patient can move control panel 3 out of the way for other activities. Furthermore, an attendant can move control panel 3 to a position that is not accessible by the patient, in the event that such access is not desired.

Support arm 4 can also be bent to position control panel 3 either at a bedside location for operation by an attendant, or at a more remote location in the healthcare station, that will permit the patient, an attendant or even a visitor to access the control panel from a bedside chair or desk. Hence, visitors can readily handle incoming telephone calls, and initiate outgoing telephone calls without disturbing the patient. Also, the patient himself can similarly operate the telephone when recreating at a bedside chair or desk, without returning to the bed.

Bedside control module 1 is particularly designed for ease of patient use, and places a large number of manually-operable controllers within comfortable reach of the patient. Furthermore, bedside control module 1 can be easily adjusted to a position that will allow either the patient, an attendant, or a visitor to operate the various control functions from a position outside of the bed.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows:

1. A bedside control module for healthcare stations of the type having a bed, and at least two remotely controlled functions, said control module comprising:
   a control panel having first and second sides;
   means for supporting said control panel at a position adjacent to the bed for access by a user;
   a first, manually-operable controller disposed on the first side of said control panel, and having means for remotely operating one of the controlled functions;
   a second, manually-operable controller disposed on the second side of said control panel, and having means for remotely operating the other one of the controlled functions; and
   means for rotatably mounting said control panel on said supporting means for manual rotation about an axis disposed generally parallel with and adjacent to said first and second sides of said control panel, whereby rotation of said control panel about said axis selectively and sequentially presents said first and second controllers to the user for manual manipulation of the same to regulate the controlled functions.

2. A bedside control module a set forth in claim 1, wherein:
   said second manually-operable controller comprises a dial portion of a speaker telephoe.

3. A bedside control module as set forth in claim 2, wherein:
   said speaker telephone dial portion has a large-button touch dial.

4. A bedside control module as set forth in claim 3, wherein:
   said speaker telephone includes a connect/disconnect button located on the second side of said control panel to selectively connect and disconnect said speaker telephone with a telephone line.

5. A bedside control module as set forth in claim 4, wherein:
   said speaker telephone includes a volume control button located on the second side of said control panel to control the volume of said speaker telephone.

6. A bedside control module as set forth in claim 5, wherein:
   said first and second sides of said control panel are translucent; and including
   a light positioned between the first and second sides of said control panels for backlighting the same.

7. A bedside control module as set forth in claim 6, wherein:
   said housing supporting means includes a bendable arm adapted to position said housing at various bedside locations to facilitate manipulation of said first and second controllers by both a patient in the bed, and other users out of the bed.

8. A bedside control module as set forth in claim 7, wherein:
   said arm is sufficiently stiff that said arm will not normally flex as a result of manipulation of said first and second controllers, and is sufficiently flexible to permit manual defection of said arm by patients and other users.

9. A bedside control module as set forth in claim 8, wherein:
said rotatable mounting means for said control panel is sufficiently tight that said control panel will not normally rotate as a result of manipulation of said first and second controllers, and is sufficiently loose to permit manual rotation of said control panel by patients and other users.

10. A bedside control module as set forth in claim 9, including:
means for preventing said control panel to rotate more than 360 degrees in one direction about said axis.

11. A bedside control module as set forth in claim 10, including:
means for sealing said control panel to prevent moisture from entering the same.

12. A bedside control module as set forth in claim 11, wherein:
said first and second controllers comprise membrane type switches.

13. A bedside control module as set forth in claim 12, wherein:
said first and second sides of said control panel are generally planar, and are oriented in a mutually parallel relationship.

14. A bedside control module as set forth in claim 13, wherein:
said axis of rotation of said control panel is disposed between the first and second sides of said control panel.

15. A bedside control module as set forth in claim 14, wherein said control panel supporting means further comprises:
a clamp connected with one end of said bendable arm, and shaped to releasably attach said bendable arm to a frame portion of the bed, such that movement of side rail portions of the bed does not adversely affect access to said control module.

16. A bedside control module as set forth in claim 15, wherein said control panel supporting means further comprises:
an elbow having a first end thereof connected with the other end of said bendable arm, and a second end thereof pivotally supporting said housing thereon.

17. A bedside control module as set forth in claim 16, wherein:
said first and second sides of said control panel include raised ridges extending about the perimeter of each manually-operable controller to facilitate locating the same by touch.

18. A bedside control module as set forth in claim 17, including:
embossed indicia positioned on the first and second sides of said control panel over each manually-operable controller to identify the same by touch.

19. A bedside control module as set forth in claim 18, including:
a swivel joint connecting said clamp to the one end of said bendable arm to rotatably interconnect the same for pivoting said control module to a storage position.

20. A bedside control module as set forth in claim 19, wherein:
one of the first and second sides of said control panel includes a headphone jack.

21. A bedside control module as set forth in claim 20, wherein the first side of said control panel further includes:
a nurse call switch;
a telephone connect/disconnect switch;
a room light switch;
a reading light switch;
an adjustable bed control switch;
a radio control switch; and
a television control switch.

22. A bedside control module as set forth in claim 1, wherein:
said first and second sides of said control panel are translucent; and including
a light positioned between the first and second sides of said control panel for backlighting the same.

23. A bedside control module as set forth in claim 1, wherein:
said housing supporting means includes a bendable arm adapted to position said housing at various bedside locations for manipulation of said first and second controllers by both a patient in the bed, and other users out of the bed.

24. A bedside control module as set forth in claim 23, wherein:
said arm is sufficiently stiff that said arm will not normally flex as a result of manipulation of said first and second controllers, and is sufficiently flexible to permit manual deflection of said arm by patients and other users.

25. A bedside control module as set forth in claim 1, wherein:
said rotatable mounting means for said control panel is sufficiently tight that said control panel will not normally rotate as a result of manipulation of said first and second controllers, and is sufficiently loose to permit manual rotation of said control panel by patients and other users.

26. A bedside control module as set forth in claim 1, including:
means for preventing said control panel to rotate more than 360 degrees in one direction about said axis.

27. A bedside control module as set forth in claim 1, including:
means for sealing said control panel to prevent moisture from entering the same.

28. A bedside control module as set forth in claim 1, wherein:
said first and second controllers comprise membrane type switches.

29. A bedside control module as set forth in claim 1, wherein:
said first and second sides of said control panel are generally planar, and are oriented in a mutually parallel relationship.

30. A bedside control module as set forth in claim 1, wherein:
said axis of rotation of said control panel is disposed between and generally parallel with the first and second sides of said control panel.

31. A bedside control module as set forth in claim 1, wherein said control panel supporting means includes:
a clamp shaped to releasably attach said control panel supporting means to a frame portion of the bed, such that movement of side rail portions of the bed does not adversely affect access to said control module.

32. A bedside control module as set forth in claim 1, wherein:
    said first and second sides of said control panel include raised ridges extending about the perimeter of each manually-operable controller to facilitate locating the same by touch.

33. A bedside control module as set forth in claim 1, including:
    embossed indicia positioned on the first and second sides of said control panel over each manually-operable controller to identify the same by touch.

34. A bedside control module as set forth in claim 1, wherein:
    one of the first and second sides of said control panel includes a headphone jack.

35. A bedside control module as set forth in claim 1, wherein the first side of said control panel further includes:
    a nurse call switch;
    a telephone pick-up switch;
    a room light switch;
    a reading light switch;
    an adjustable bed control switch;
    a radio control switch; and
    a television control switch.

36. A bedside communicator for hospital beds and the like, comprising:
    a control panel;
    an adjustable arm supporting said control panel in a cantilevered fashion at a position over the bed for access thereto by a patient reclined on the bed; and
    a loud speaker telephone having a push-button dial comprising a large-button membrane switch encompassing a major portion of said control panel and a push-button line connect/disconnect controller mounted on said control panel for manual operation by the patient; and wherein
    said adjustable arm is sufficiently stiff that said arm will not normally flex as a result of manipulation of either said dial or said line connect/disconnect controller, and is sufficiently flexible to permit manual deflection of said arm by patients and other users, whereby the patient can initiate outgoing telephone calls and terminate the same with a single hand from a reclined position in the bed.

37. A bedside communicator as set forth in claim 36, wherein:
    said membrane switch is translucent; and including
    a light positioned behind said membrane switch and backlighting the same.

38. A bedside communicator as set forth in claim 37, wherein:
    said control panel includes a manually operable controller with means for answering incoming telephone calls.

* * * * *

UNITED STATES PATENT AND TRADEMARK OFFICE
CERTIFICATE OF CORRECTION

PATENT NO. : 4,680,790

DATED : July 14, 1987

INVENTOR(S) : Richard F. Packard and Kenneth R. Cover

It is certified that error appears in the above-identified patent and that said Letters Patent is hereby corrected as shown below:

Column 3, Line 54:
"controller 29-31" should be --controllers 28-31--.
Column 4, Line 6:
"control 30" should be --controller 35--.
Column 4, Line 27:
"rear corner" should be --rear cover--.
Column 4, Line 43:
"controllers 29-31" should be --controllers 28-31--.
Column 5, Line 32:
"controllers 29-31" should be --controllers 28-31--.
Column 6, Claim 2, Line 29:
"a" should be --as--.
Column 6, Claim 2, Line 32:
"telephoe" should be --telephone--.
Column 6, Claim 8, Line 67:
"defection" should be --deflection--.

Signed and Sealed this

Fifth Day of July, 1988

Attest:

DONALD J. QUIGG

Attesting Officer

Commissioner of Patents and Trademarks